April 24, 1928.

T. F. YAGLE

MOTION PICTURE PROJECTOR

Filed Aug. 8, 1924    2 Sheets-Sheet 1

Theodore F. Yagle
INVENTOR

BY *Victor J. Evans*
ATTORNEY

WITNESS:

April 24, 1928.

T. F. YAGLE 1,667,645

MOTION PICTURE PROJECTOR

Filed Aug. 8, 1924

Theodore F. Yagle, INVENTOR

BY Victor J. Evans
ATTORNEY

WITNESS:

Patented Apr. 24, 1928.

1,667,645

UNITED STATES PATENT OFFICE.

THEODORE F. YAGLE, OF PHILADELPHIA, PENNSYLVANIA.

MOTION-PICTURE PROJECTOR.

Application filed August 8, 1924. Serial No. 730,945.

This invention relates to an improved appliance or attachment for use in connection with a motion picture projecting apparatus, and an object of the invention is to provide an attachment or appliance which can be easily applied to any motion picture projecting machine already in use, without in any way changing the construction of such machine, and yet will permit pictures to be projected upon a screen in such a manner as to lend realism to the pictures, and yet at the same time create distance and perspective to the picture, in other words rendering pictures less flat to the eye.

There have been previous experiments in motion picture projection, for the purpose of providing depth and lending realism to the pictures, as projected upon the screen, principal among which has been the method wherein two colors such as red and blue or red or green images or positives of the pictures have been made upon the film, one of the images being offset laterally with respect to the other image, and when projected upon the screen and viewed in the usual manner, a resulting blur of the colors was provided, but when viewed through lenses of colors corresponding to the colors of the images on the film, namely, a red lens and a blue lens or a red lens and a green lens, the two different images projected upon the screens merge and provide perspective or depth to the pictures lending realism thereto.

This system is very expensive, particularly in the construction or manner of manufacture of the films wherein the two positive and different colored images in lateral offset relation are required, rendering the cost of the films prohibitive.

The object of the present invention is to provide an apparatus or projecting mechanism by means of which pictures of the approved type of film, which however, must be quite clear and distinct in its images, may be projected upon the screen, in two laterally offset images or pictures which are merged one into the other by the utilization of lens through which each spectator visions the pictures, thereby providing the depth, as well as the breadth and length and in other words perspective, to the pictures.

A further object of the invention is to provide a projecting apparatus as specified, in which the distinctive features of the device may be applied to any approved type of motion picture projecting machine now in use.

A further object of the present invention is to provide a motion picture projecting apparatus which embodies the essential features and fundamental principles of the approved types of projecting machines upon the market that uses in combination therewith, a rotatable shutter, including a mirrored lens on a portion of the rear surface thereof, similar to the shutter shown in my companion application, filed on October 29th, 1921, Serial No. 511,269, which mirrored lens projects or reflects the pictures upon a mirror rearwardly of the initial projecting lens from which they are projected through a colored lens upon the screen at a laterally offset position relative to the images which are projected direct through the lens and through a second lens of one of the other major or principal colors upon the screen, thereby providing the two images in lateral offset relationship of different fundamental colors which when viewed through the lens carried by the individual spectators, merge to provide the perspective effect of the pictures.

Other objects of the invention will appear in the following detail description, and in the accompanying drawings wherein.

Figure 1:
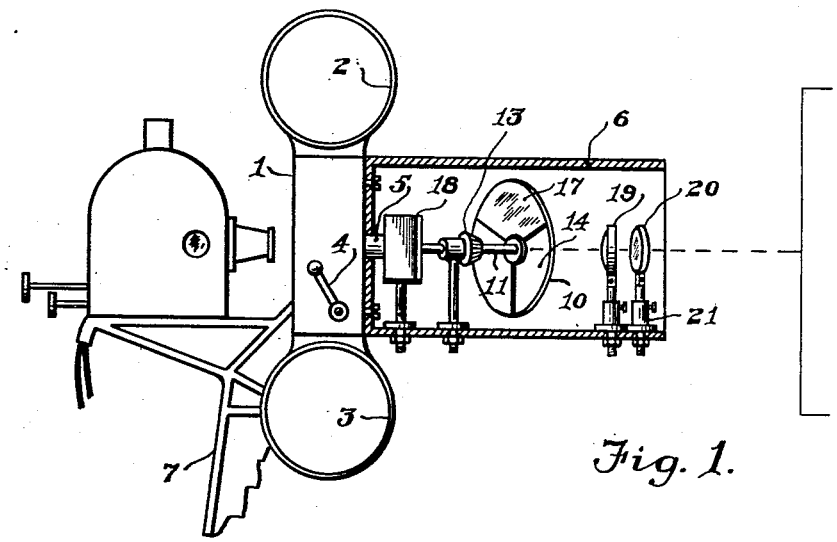
Figure 1 is a side elevation of the motion picture projecting apparatus constructed in accordance with this invention.
Figure 2:
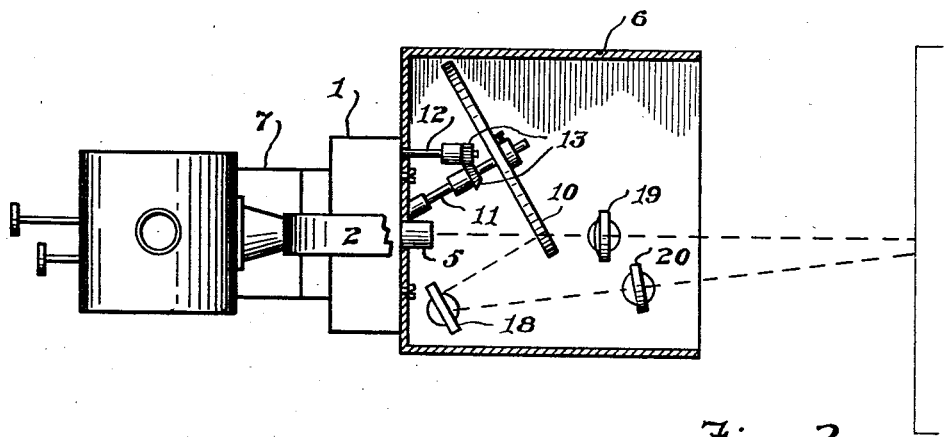
Figure 2 is a top plan of the apparatus.
Figure 3:
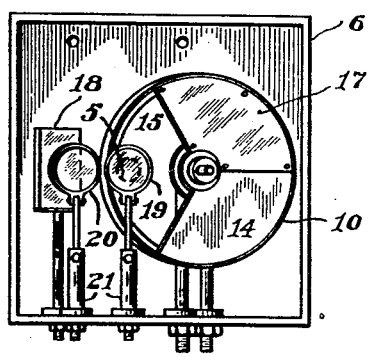
Figure 3 is a front elevation of the improved projecting apparatus.
Figure 4:
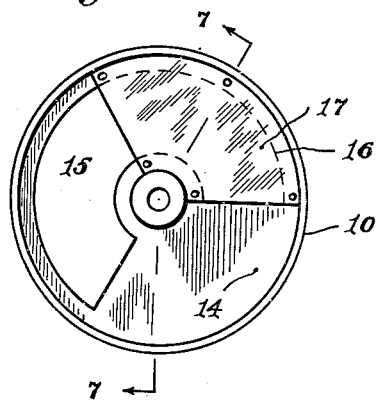
Figure 4 is a detail view of the shutter.
Figure 7:
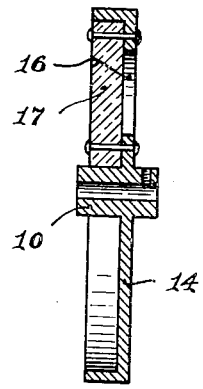
Figure 7 is a section through the shutter taken on the line 7—7 of Figure 4.
Figure 5:
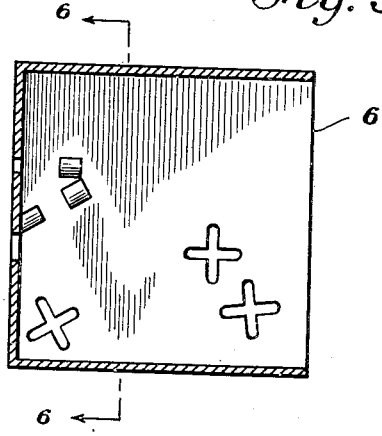
Figure 5 is a detail section through a part of the machine.
Figure 6:
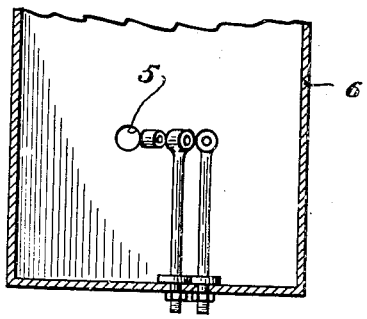
Figure 6 is a detail view on line 6—6 Figure 5 of a part of the projecting machine.
Figure 8:
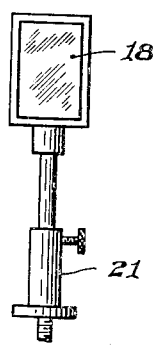
Figure 8 is a detail view in side elevation of the mirror 18 and its adjustable supporting means.

Referring more particularly to the drawings, the improved motion picture projecting apparatus comprises the usual approved type of housing 1 which carries the upper and lower film boxes 2 and 3 from one of which to the other the film is wound either mechanically or by means of the crank, as shown at 4. The housing 1 has a lens tube 5 thereon in which the approved type of objective lens is mounted through which the motion pictures from the film are projected from the usual approved type of light source.

In the present invention, however, the shutter 10 which controls the intermittent projection of the pictures upon a screen is positioned at an angle to the axis of the lens tube 5, the angle of the shutter being regulated, as required to provide the proper angle of refraction. The shutter 10 is mounted upon a shaft 11 carried by suitable bearings and it is rotated from a shaft 12 by means of beveled gears 13, while the shaft 12 may be rotated in any suitable manner from the approved type of shutter rotating mechanism (not shown). The shutter 10 is of novel construction, being divided into three sections. The closed or solid portion 14 of the shutter 10 which cuts off the projection of the picture, the open section 15 and also of the reflecting section 16. The reflecting section 16 is solid but has a mirrored lens 17 on its rear face, as well as a reflecting action for the purpose of enhancing the stereoscopic projection of the pictures. When the mirrored portion 17 of the shutter 10 is in front of the lens tube 5, the pictures at that time being projected through the lens will be reflected from the mirror 17 upon an adjustable mirror 18 which is positioned rearwardly of the shutter 10, and at one side of the axis of the lens tube 5. The mirror 18 in turn reflects the pictures through the tube in laterally offset relation to the direct projection of the pictures through the lens tube 5 upon the screen (not shown), and thus two separate and individual projections of the pictures on the film will be made upon the screen, one of which is laterally offset relative to the other.

It has been found by extensive experiments that by projecting these two laterally offset images in different major colors, such as red and blue or red and green, and then visioning the resulting colored offset projection of the images through suitable colored lens by each individual spectator, a picture is provided with three (3) dimensions, namely, height, width and depth in lieu of the usual two (2) dimensions of height and width now embodied in motion picture projection. It will be readily appreciated, that by providing the illusion of the third dimension to the projection of the pictures that much more realistic results will be obtained and that images moving on the screen towards the audience will appear to be actually moving to or even among the audience, and similar results will be provided by receding images making the pictures much more life-like and realistic.

The shutter is located within a casing 6, wherein the mirror 18, a projecting lens 19 and a complementary plano color filter lens 20 are mounted. The lens 19 is of the usual projecting type and includes a color filter which is red on one side of the spectrum, while the complementary plano filter lens 20 is either blue or green, the mirror 18 adapted to receive the reflection of the image from the mirror 17 of the shutter and reflect it through the plano color filter 20 upon the screen (not shown). The mirror 18, as shown in Figure 9, is adjustable so as to reflect the image, when received from the mirror 17 of the shutter 10, through the plano color filter lens to properly coincide with the image when projected from the lens tube 5 through the open section of the shutter and through the lens 19 and its color filter, and such actions are in rapid alternate succession, thereby creating true perspective and distance to the picture which is transmitted to the screen, not shown. The color filters 19 and 20 are disposed in proper laterally spaced relation, one to the other, and at the necessary accurately determined distance forwardly of the outer projecting end of the lens tube 5, and they are also arranged so that the images projected therethrough respectively from the adjustable mirror 18 and the direct projection of the picture, will be projected in the proper lateral spaced relationship upon the screen, to cause them to properly merge when viewed through colored lens by the individual spectator. A suitable supporting bracket structure 21 is provided for carrying or supporting the lens 19 including a color filter with the color red on one side of the spectrum and a complementary plano color filter 20. The bracket which supports the lense 19 and its color filter may be adjustable longitudinally to vary the distance between the outer end of the lens tube 5 and the lens and its color filter 19. The bracket which supports the complementary plano color filter 20 may be correspondingly adjusted, that is toward and from the mirror 18. Also these brackets 21 may be adjusted vertically to regulate the elevation of the lenses 19 and 20 and their respective color filters.

The present application is an improvement and enlargement on the principle and theory of motion picture projection as disclosed in my companion application, filed Oct. 29th, 1921, Serial No. 511,269.

It is, of course, to be understood, that the invention may be constructed in various other manners and the parts associated in different relations, and therefore, I do not desire to be limited in any manner, except as set forth in the claims hereunto appended.

What I claim is:—

1. An appliance for attachment to a motion picture machine which includes a direct picture projecting means, a casing for detachable connection to the frame of said machine, a shutter operable upon an axis at an acute angle to the axis of the lens tube of the direct picture projecting means, a projecting lens and color filter with its axis in direct alignment with the axis of the direct picture projecting means, said shutter being divided into three portions, an open section, a closed or covered section and a mirror or reflecting section, a complementary plano color filter in the casing to one side of the axis of the direct picture projecting means, and an adjustable mirror for receiving the reflection from the mirrored or reflecting section of the shutter and reflecting the picture through the plano color filter.

2. In an appliance for attachment to a motion picture machine which includes a direct picture projecting means, the combination with a casing for attachment to the frame of said machine, of a shutter rotatable on an axis at an acute angle to the axis of the direct picture projecting means, said shutter having an open segment, a closed or covered segment and a mirrored or reflecting segment traveling in a path cutting through the axis of the direct picture projecting means, a mirror positioned within the casing to receive the reflection of the picture from the mirrored or reflecting section of the shutter, and a pair of lenses and complementary color filters positioned within the casing, whereby the alternate directly projected and reflected pictures will pass through said lenses in quick alternate succession and be projected upon a screen in complementary colors.

3. An appliance for attachment to a motion picture machine which includes a direct picture projecting means, a casing for detachable connection to the frame of said machine, a shutter operable upon an axis at an acute angle to the axis of the lens tube of the direct picture projecting means, a projecting lens and color filter with its color red on one side of the spectrum and its axis in direct alignment with the axis of the direct picture projecting means, said shutter being divided into three portions, an open section, a closed or covered section and a mirror or reflecting section, a complementary plano color filter in the casing to one side of the axis of the direct picture projecting means, and an adjustable mirror for receiving the reflection from the mirrored or reflecting section of the shutter and reflecting the picture through the plano color filter.

In testimony whereof I affix my signature.

THEODORE F. YAGLE.